(No Model.) 2 Sheets—Sheet 2.

H. McKAY.
PRESS.

No. 427,604. Patented May 13, 1890.

Witnesses:
Edgar A. Goddin
Frederick L. Emery

Inventor:
Hiram McKay,
by Crosby & Gregory
Attys

UNITED STATES PATENT OFFICE.

HIRAM McKAY, OF BOSTON, MASSACHUSETTS.

PRESS.

SPECIFICATION forming part of Letters Patent No. 427,604, dated May 13, 1890.

Application filed October 18, 1889. Serial No. 327,436. (No model.)

*To all whom it may concern:*

Be it known that I, HIRAM McKAY, of Boston, county of Suffolk, State of Massachusetts, have invented an Improvement in Presses, of which the following description, in connection with the accompanying drawings, is a specification, like letters and figures on the drawings representing like parts.

This invention has for its object to construct a machine for pressing vegetables, meats, fruits, and other articles of food which may be easily operated, subjecting the material to a considerable pressure, and yet very durable.

In accordance with this invention a tank or reservoir is placed detachably in a frame and is adapted to be swung into a position beneath a platen or plunger, and thereafter swung aside to permit access to the contents of the tank or receiver. The tank or receiver has a removable perforated bottom plate, and vegetables and the like may be forced through the openings therein, said openings being of different shapes to give shape to the pieces forced through it. A removable perforated or reticulated basket is designed to be placed in the tank or receiver when desired to hold the material or pulp while the juices are eliminated—as, for instance, when obtaining the juices from grapes, &c. All the parts are detachable, so that they may be cleansed.

My invention consists in details of construction to be hereinafter pointed out.

Figure 1:
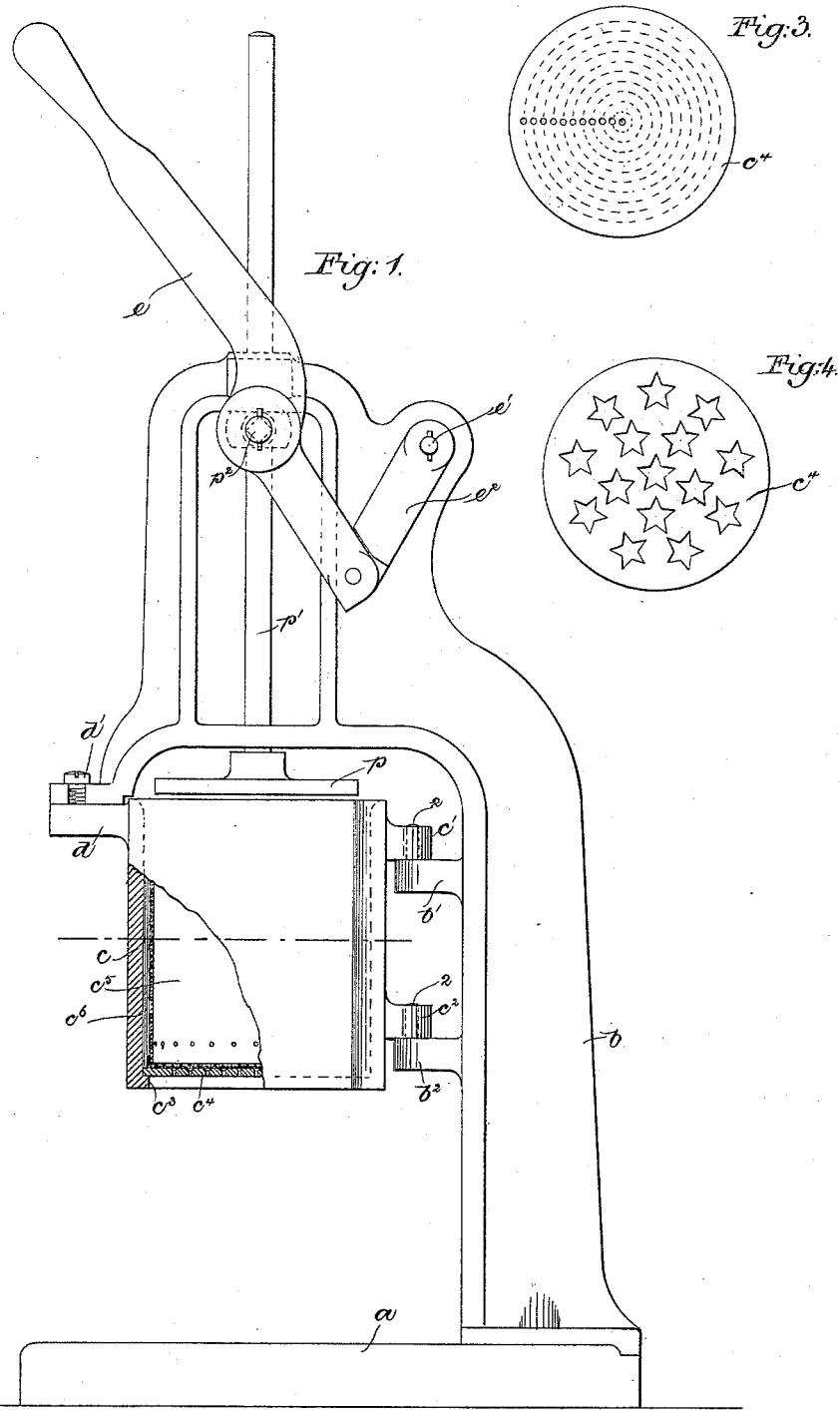
Figure 2:
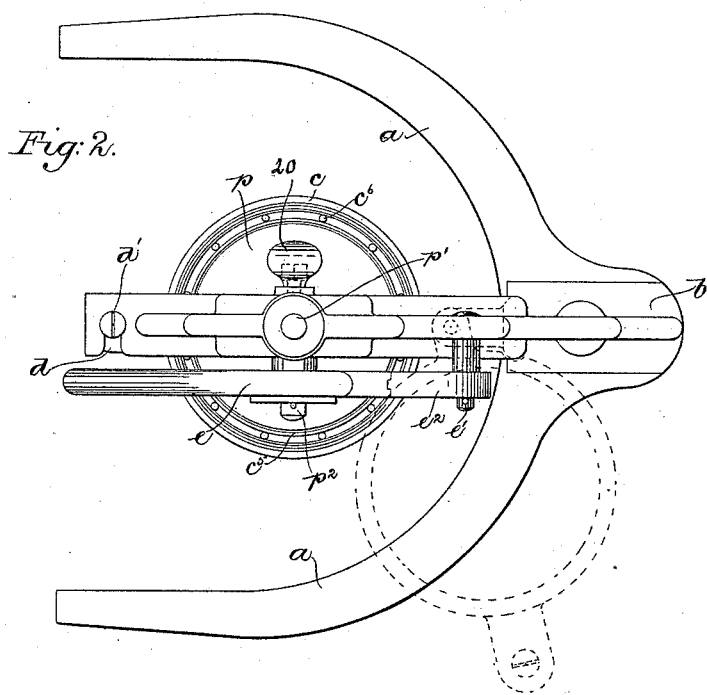
Figure 5:
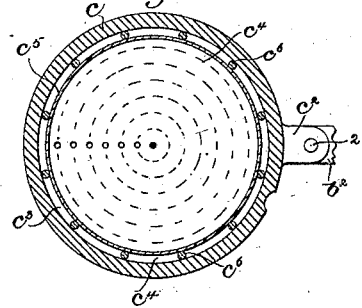

Figure 1 shows in side elevation a press embodying this invention, part of the tank or receiver being shown in section; Fig. 2, a plan view of the press shown in Fig. 1; Figs. 3 and 4, modified forms of bottom plates for the tank or receiver; Fig. 5, a cross-section of the tank or receiver; and Fig. 6, a vertical section of the tank or receiver; the basket or reticulated frame being removed.

The base $a$ is formed to present an opening to receive a dish of suitable shape. Secured to or formed integral with the base $a$ is an upright $b$, supporting the operating parts. The upright $b$ has two lugs $b'$ $b^2$ one above the other, each having a vertical pin, as 2.

The tank or receiver $c$ is made as a cylinder, open at each end, and has formed on it exteriorly at one side two lugs $c'$ $c^2$, having openings to receive the pins 2 of the lugs $b'$ $b^2$, so that when placed thereon the said cylinder or receiver $c$ may be swung on the pins, and may be also readily removed therefrom. The tank or receiver $c$ has also a lug $d$, to which is attached a pin $d'$, which latter, when the receiver $c$ is swung into position to receive the platen or plunger, enters an opening formed in a projection on the upright $b$. The pin $d'$, as herein shown, is a screw, which may be turned down to lock the receiver in such position.

The platen or plunger $p$ is arranged on a rod $p'$, having its bearings in the upright or frame-work of the machine. Fastened to the rod $p$ is a stud $p^2$, on which is pivoted the operating-lever $e$, one end of said lever being loosely connected with the fixed stud $e'$ on the frame-work by a link $e^2$, thereby constituting a toggle-jointed operating-lever. A set-screw 20 (see Fig. 2) is provided, which may be turned to act on and hold the rod $p'$ in any desired position—as, for instance, to hold the platen or plunger down on the material for a length of time.

The tank or receiver $c$ has formed within it at its lower end a flange $c^3$, on which rests a perforated bottom plate $c^4$, and a reticulated frame $c^5$ is placed in the tank or receiver, the side walls of which are strengthened externally by strips $c^6$, which strips also serve to keep the said frame away from contact with the interior walls of the tank or receiver $c$.

The meat or, it may be, vegetables or the like are placed in the tank or receiver. It is then swung into position beneath the plunger and the latter depressed by means of the operating-lever.

Figure 6:
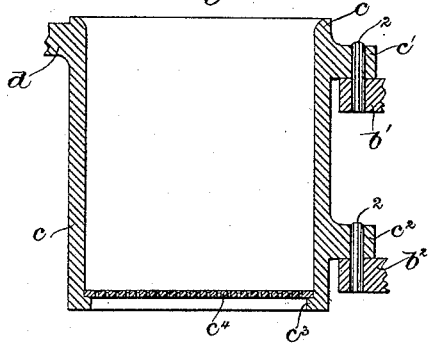

The reticulated frame $c^5$ may be omitted, if desired, as shown in Fig. 6.

The perforations of the bottom plate $c^4$ may vary in shape, as desired, two forms only, however, being herein shown. (See Figs. 3 and 4.)

I claim—

1. In a press for the purposes indicated, the base and the upright having lugs $b'$ $b^2$ and pins 2, combined with the tank or receiver $c$, having lugs $c'$ $c^2$, provided with openings to receive the said pins 2, and the platen or plunger, substantially as described.

2. In a press for the purposes indicated, the base $a$, upright $b$, having a projection with a recess therein, the detachable swinging tank or receiver $c$, having a lug $d$ at its upper end, and the screw $d'$, which may enter the recess in the projection of the upright $b$, combined with the plunger or platen and operating-lever for it, substantially as described.

3. In a press for the purposes indicated, the combination of the base $a$, upright $b$, detachable swinging tank or receiver $c$, open at each end substantially the full diameter of the plunger or platen, which moves in it, and having a removable perforated bottom plate and a locking device for the said tank or receiver, and an operating-lever for moving the plunger or platen in the tank or receiver, substantially as described.

4. In a press of the kind described, the base $a$, upright $b$, detachable swinging tank or receiver $c$, having a removable perforated bottom plate, and the inner removable reticulated frame, comprising a bottom and side walls, combined with the platen or plunger and the operating-lever therefor, substantially as described.

5. In a press of the kind described, the base $a$, upright $b$, and tank or receiver $c$, combined with the platen or plunger $p$, arranged on a rod $p'$, a lever for moving it, and a set-screw 20, to be turned against the rod $p'$ when desired to hold it in whatever position it may be put, substantially as described.

In testimony whereof I have signed my name to this specification in the presence of two subscribing witnesses.

HIRAM McKAY.

Witnesses:
BERNICE J. NOYES,
E. J. BENNETT.